United States Patent
Tell

(10) Patent No.: US 6,464,262 B1
(45) Date of Patent: Oct. 15, 2002

(54) MECHANICAL INTERFACE CONNECTION FOR VACUUM EJECTORS, AND A MODULAR ASSEMBLY FOR SUPPLYING NEGATIVE PRESSURE TO AN INDUSTRIAL PROCESS BY MEANS OF AT LEAST ONE VACUUM EJECTOR DRIVEN BY COMPRESSED AIR

(75) Inventor: Peter Tell, Akersberga (SE)

(73) Assignee: Piab AB, Taby (SE)

( * ) Notice: Subject to any disclaimer, the term of this patent is extended or adjusted under 35 U.S.C. 154(b) by 0 days.

(21) Appl. No.: 09/658,983

(22) Filed: Sep. 11, 2000

(30) Foreign Application Priority Data

Sep. 15, 1999 (SE) .............................................. 9903287

(51) Int. Cl.$^7$ ............................................. F16K 11/10
(52) U.S. Cl. ...................... 285/124.5; 403/338; 403/363
(58) Field of Search ......................... 285/124.1, 124.4, 285/124.5, 125.1; 403/295, 331, 338, 354, 363, 375, 381

(56) References Cited

U.S. PATENT DOCUMENTS

| | | | | |
|---|---|---|---|---|
| 2,614,796 A | * | 10/1952 | Miller | 403/338 |
| 2,680,034 A | * | 6/1954 | Robbins | 403/331 |
| 3,888,518 A | * | 6/1975 | Delessert | 285/124.5 |
| 3,917,318 A | * | 11/1975 | Legris | 285/124.5 |
| 3,934,605 A | * | 1/1976 | Legris | 285/125.1 |
| 4,082,324 A | * | 4/1978 | Obrecht | 285/124.5 |
| 4,392,677 A | * | 7/1983 | Hardouin | 285/124.5 |
| 5,666,713 A | * | 9/1997 | Kubota | 403/331 X |
| 5,881,773 A | * | 3/1999 | Lukas et al. | 285/124.5 |
| 5,887,629 A | * | 3/1999 | Mettler et al. | 403/363 |
| 6,039,358 A | * | 3/2000 | Stoll et al. | 285/124.5 |
| 6,101,920 A | * | 8/2000 | Leonhardt | 403/381 X |

FOREIGN PATENT DOCUMENTS

EP 0056960 * 8/1982 ............. 403/331 X

* cited by examiner

Primary Examiner—Lynne H. Browne
Assistant Examiner—David E. Bochna
(74) Attorney, Agent, or Firm—Young & Thompson

(57) ABSTRACT

An assembly for generating a negative pressure in an industrial process includes a plurality of interconnected units formed with wedge-shaped connections in their mutually contacting surfaces. Intermediate units in the assembly, such as an ejector housing, are formed in each contact surface thereof with the same type of connections. Accordingly, one end of the unit includes a female connection on one side thereof, and a male connection on the opposite side, whereas the other end of the unit includes a male connection on the first side and a female connection on the opposite side. The connections include inclined slide surfaces, providing a hook mount which presses the units together in a wedging effect as the units are axially displaced relative to each other. The displacement is produced by a bolt acting between the units.

4 Claims, 1 Drawing Sheet

MECHANICAL INTERFACE CONNECTION FOR VACUUM EJECTORS, AND A MODULAR ASSEMBLY FOR SUPPLYING NEGATIVE PRESSURE TO AN INDUSTRIAL PROCESS BY MEANS OF AT LEAST ONE VACUUM EJECTOR DRIVEN BY COMPRESSED AIR

TECHNICAL BACKGROUND

The invention is concerned with a mechanical interface, or more specifically a snap-on connection or quick-coupling for associated units incorporated in a modular assembly having at least one vacuum ejector adapted to provide a negative pressure. The present invention also refers to a modular assembly for supplying a negative pressure to an industrial process, said assembly comprising at least one vacuum ejector driven by compressed air and operative for evacuating air from said process.

Vacuum ejectors that are driven by compressed air are specifically advantageous for shifting operational conditions in industrial environments, due to their small dimensions and a construction that needs little maintenance. Operationally adapting the ejectors may include combining several ejectors into an assembly that provides a desired effect. Such assemblies may also comprise additional devices for connecting the assembly to the process that is driven by the ejectors, or to other external equipment.

In connection herewith there is a need and desire to reduce time and costs for assembling the system, and to eliminate any mechanical or set-up problems that may arise when incorporating supplemental couplings, fittings and additional adapter elements.

OBJECT OF INVENTION

The object of this invention is to provide a mechanical interface connection between units that are incorporated in an assembly for supplying a negative pressure to an industrial process. Another object of the invention is to provide a modular assembly having substantial flexibility while being adapted to shifting operational conditions of the industrial process.

SUMMARY OF THE INVENTION

Briefly the invention suggests that adjacent units, incorporated in the assembly, in contact surfaces thereof are formed with snap-on connections resembling a mirrored hook mounting. The connection provides a wedging action upon axial relative displacement of the connected units, the coupled units being axially arrested by means of a locking bolt.

BRIEF DESCRIPTION OF THE DRAWING

The invention is further disclosed below, reference being made to the attached drawing.

The sole drawing FIGURE illustrates a first embodiment of the invention.

DETAILED DESCRIPTION OF INVENTION

Figure 1:
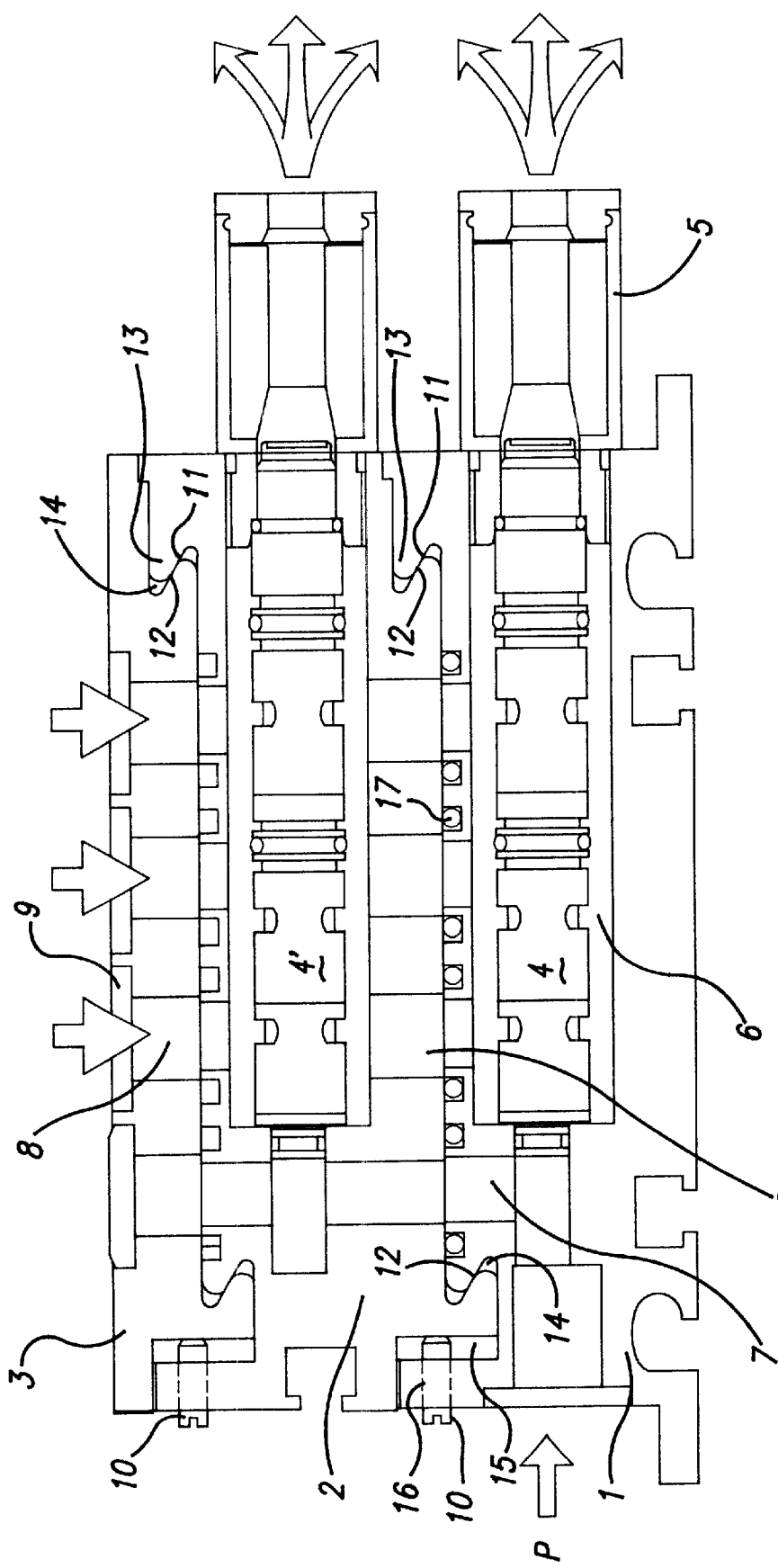

In the drawing, an assembly is illustrated comprising three interconnected vacuum ejector units 1, 2 and 3. The shown assembly will exemplify the invention which may be applied for connecting any desired number of units.

An ejector house 1 is formed on its bottom side with seat mountings for connecting to a mount support, not further shown, An ejector body 4 adapted to operate by compressed air is accommodated in the housing 1, the ejector body carrying a silencer 5 protruding from one end of the ejector housing. In the opposite end thereof, compressed air is supplied and forced through the ejector 4 as illustrated by the arrow P, whereby negative pressure is generated in an annular space 6 defined about the ejector 4 and communicating with the process such as to be operative for evacuating air from the process.

A second ejector housing 2 is connected to the housing 1 and accommodating a second ejector body 4. Channels 7 for compressed air and channels 8 for evacuated air are formed to establish fluid flow communication between the two ejector housings 1 and 2.

A modular adapter 3 is attached to the second ejector housing 2 and comprising connections 9 that are formed for connecting the vacuum channels 8 to an industrial process (not shown), driven by the assembly.

A quick-coupling is formed at the interface between connected units 1, 2 and 3, by which the units are snapped together and locked in the interconnected position by means of a bolt 10. Said quick-coupling may be compared to a hook mount and is formed to generate a wedging action upon axial relative displacement of adjacent units 1 and 2, 2 and 3, respectively, Such axial displacement into an arrested position is performed through the bolt 10, extended axially upon rotation to act between interconnected units.

Sloping slide faces 11 and 12, respectively, are formed at the end portions of opposite and contacting, planar surfaces of the units. One of the sloping faces 11 extends above the unit surface, and the other sloping face 12 is extended below said surface. The sloping face 11 is arranged on a wedge-formed protrusion 13, providing a male connection, and the sloping face 12 is arranged on a wedge-formed recess 14, providing a female connection. The recess 14 provides a gap 15 having a width sufficient for the protrusion 13 to be inserted in the recess 14 without the sloping faces 11 and 12 contacting each other. The sloping faces are formed to have an inclination relative to the planar contact surfaces of the units in the order of 45°, or less.

Even if not explicitly shown herein, it will be understood that interconnected units also may be formed with identical female and male connections. In such alternative embodiment the bolt 10 may be inserted from any desired end or from both ends of the assembly, in order to lock the units in the assembled position.

In yet another embodiment, the units may be formed in one contact surface thereof with two female connections, and in the other surface with two male connections. The shown embodiment wherein one of the sliding faces protrudes above the contact surface of the unit, and the other sliding face is recessed below the contact surface, is the preferred embodiment due to material savings and the compact assembly made possible hereby.

The assembly for generating a negative pressure in an industrial process according to the invention is characterized in that the interconnected units are formed with wedge-shaped connections in their mutually contacting surfaces. Intermediate units in the assembly, such as the ejector housing 2 of the drawing, are formed in each contact surface thereof with the same type of connections: accordingly, in one end the unit comprises a female connection 11 on one side thereof, and a male connection 13 on the opposite side, whereas the other end of the unit comprises a male connection on the first said side and a female connection on the opposite side. The connections comprise inclined slide surfaces 11,12, providing a hook mount which presses the units together in a wedging effect as the units are axially displaced relative to each other, the displacement being produced by means of a bolt acting between the units.

What is claimed is:

1. A mechanical interface, connecting units incorporated in a modular assembly adapted to supply negative pressure for an industrial process, the assembly comprising at least one vacuum ejector accommodated in one of said units and driven by compressed air for evacuating air from said process, the at least one ejector being in mutual fluid flow communication through channels formed in the units, said mechanical interface being defined in contact surfaces of adjacent, interconnected units of the assembly, the interface comprising inclined slide faces formed for mutual engagement and for providing a wedging action upon relative, axial displacement of the units into an interlocking position upon assembly, wherein the inclined slide faces are formed at end portions of the contact surface of each unit such that one of the slide faces extends above the surface, and another slide face extends below said surface.

2. The mechanical interface connection of claim 1, wherein one of the slide faces (12) is formed in a recess, providing a female connection (14), and the other slide face (11) is formed on a protrusion, providing a male connection (13) in opposing contact surfaces, respectively, of the unit.

3. The mechanical interface connection of claim 1, wherein a bolt (10) acting between the interconnected units (1 and 2; 2 and 3; etc.) locks the units axially in their interconnected positions.

4. A modular assembly adapted for supplying a negative pressure by at least one vacuum ejector driven by compressed air, the assembly comprising at least one vacuum ejector housing in fluid flow communication through channels formed therein, one housing of the assembly comprising mating connections defined in opposing contact surfaces of another housing, the connections having inclined slide faces in mutual engagement upon relative axial displacement of the housings, the connections being locked in an engaged position by a bolt acting between the housings in an interconnected position, wherein intermediate housings of the assembly are formed on one side thereof with a female connection in a first end and a male connection in the other end, and on the opposite side are formed with a male connection in the first end and a female connection in the other end, as seen longitudinally of said one housing.

* * * * *